United States Patent [19]

Pyzik et al.

[11] Patent Number: 5,091,347
[45] Date of Patent: * Feb. 25, 1992

[54] SELF-REINFORCED SILICON NITRIDE CERAMIC BODY AND A METHOD OF PREPARING THE SAME

[75] Inventors: Aleksander J. Pyzik; Barbara M. Pyzik, both of Midland, Mich.

[73] Assignee: The Dow Chemical Company, Midland, Mich.

[*] Notice: The portion of the term of this patent subsequent to Apr. 24, 2007 has been disclaimed.

[21] Appl. No.: 567,889

[22] Filed: Aug. 15, 1990

[51] Int. Cl.$^5$ .............................................. C04B 35/02
[52] U.S. Cl. ........................................ 501/95; 501/96; 501/97; 501/98
[58] Field of Search ........................ 501/95, 96, 97, 98

[56] References Cited

U.S. PATENT DOCUMENTS

| | | | |
|---|---|---|---|
| 3,950,464 | 4/1976 | Masaki | 264/65 |
| 4,004,937 | 1/1977 | Masaki | 106/59 |
| 4,025,351 | 5/1977 | Masaki | 106/59 |
| 4,046,580 | 9/1977 | Ishii et al. | 106/55 |
| 4,097,293 | 6/1978 | Komeya et al. | 106/43 |
| 4,119,689 | 10/1978 | Prochazka et al. | 264/65 |
| 4,179,301 | 12/1979 | Buljan | 106/73.5 |
| 4,218,257 | 8/1980 | Oda | 106/73.5 |
| 4,227,842 | 10/1980 | Samanta et al. | 409/131 |
| 4,279,657 | 7/1981 | Greskovich | 106/73.5 |
| 4,296,065 | 10/1981 | Ishii et al. | 264/325 |
| 4,323,325 | 4/1982 | Samanta et al. | 409/131 |
| 4,406,668 | 9/1983 | Sarin et al. | 51/295 |
| 4,407,970 | 10/1983 | Komatsu et al. | 501/97 |
| 4,511,402 | 4/1985 | Miura et al. | 501/97 |
| 4,511,525 | 4/1985 | Tsuge et al. | 264/65 |
| 4,543,345 | 9/1985 | Wei | 501/95 |
| 4,603,116 | 7/1986 | Smith et al. | 501/97 |
| 4,609,633 | 9/1986 | Fukuhara | 501/97 |
| 4,652,276 | 3/1987 | Burden | 51/308 |
| 4,699,890 | 10/1987 | Matsui | 501/98 |
| 4,717,693 | 1/1988 | Wittmer | 501/97 |
| 4,734,234 | 3/1988 | Sterzel | 264/66 |
| 4,753,764 | 6/1988 | Kamijo et al. | 501/95 |
| 4,870,036 | 9/1989 | Yeh | 501/97 |
| 4,883,776 | 11/1989 | Pyzik et al. | 501/95 |
| 4,891,342 | 1/1990 | Yokoyama | 501/98 |
| 4,919,689 | 4/1990 | Pyzik et al. | 501/95 |
| 4,920,085 | 4/1990 | Yoshida et al. | 501/97 |
| 4,923,829 | 5/1990 | Yasutomi | 501/95 |

FOREIGN PATENT DOCUMENTS

| | | |
|---|---|---|
| 079678 | 5/1983 | European Pat. Off. . |
| 100380 | 2/1984 | European Pat. Off. . |
| 228022 | 7/1987 | European Pat. Off. . |
| 58-064274 | 4/1983 | Japan . |
| 59-021413 | 2/1984 | Japan . |
| 61-78657 | 4/1986 | Japan . |
| 61-106430 | 5/1986 | Japan . |

OTHER PUBLICATIONS

Akihiko Tsuge et al., Journal of The American Ceramics Society, 58 323-326 (1975).
F. F. Lange, Journal of The American Ceramics Society, 62, 1369-1374 (1983).
Chemical Abstract 105:157787w (1986).

*Primary Examiner*—William R. Dixon, Jr.
*Assistant Examiner*—Sue Hollenbeck
*Attorney, Agent, or Firm*—D. R. Howard

[57] ABSTRACT

Prepare a self-reinforced silicon nitride ceramic body of high fracture toughness by hot-pressing a powder mixture containing silicon nitride and three other components under conditions such that densification and the in situ formation of β-silicon nitride whiskers having a high aspect ratio occur. The other components are silicon dioxide as a densification aid, a conversion aid such as yttrium oxide and a compound, such as calcium oxide, which enhances growth of β-silicon nitride whiskers. The resultant silicon nitride ceramic has a β-silicon nitride cyrstalline phase, at least 20 volume percent of which is in the form of whiskers or elongated grains having an average aspect ratio of at least about 2.5, and a glassy second phase. The glassy phase contains the silicon dioxide, the conversion aid and the compound which enhances growth of β-silicon nitride whiskers. The glassy phase may also include a minor amount of aluminum nitride or boron nitride.

17 Claims, No Drawings

008# SELF-REINFORCED SILICON NITRIDE CERAMIC BODY AND A METHOD OF PREPARING THE SAME

BACKGROUND OF THE INVENTION

This invention pertains to a silicon nitride ($Si_3N_4$) ceramic body and a process for preparing the ceramic body.

Silicon nitride ceramics are recognized for their excellent mechanical and physical properties, including good wear resistance, low coefficient of thermal expansion, good thermal shock resistance, high creep resistance and high electrical resistivity. In addition, silicon nitride ceramics are resistant to chemical attack, particularly to oxidation. Because of these attributes, silicon nitride is useful in a variety of wear and high temperature applications, such as cutting tools and parts in pumps and engines.

Failure of silicon nitride ceramics is generally associated with brittleness and flaws. The object therefore is to prepare a silicon nitride ceramic with high fracture toughness ($K_{IC}$) and strength. Fracture strength is directly proportional to the fracture toughness and inversely proportional to the square root of the flaw size. High fracture toughness combined with small flaw size is therefore highly desirable. Monolithic silicon nitride, however, has a relatively low fracture toughness of about 5 MPa $(m)^{\frac{1}{2}}$.

SUMMARY OF THE INVENTION

A first aspect of this invention is a process for preparing a self-reinforced silicon nitride ceramic body containing predominately $\beta$-silicon nitride whiskers having a high average aspect ratio. The process comprises subjecting a powder mixture comprising:

(a) silicon nitride in an amount sufficient to provide a ceramic body;
(b) silicon dioxide in an amount sufficient to promote densification of the powder;
(c) a conversion aid in an amount sufficient to attain essentially complete conversion of the starting silicon nitride to $\beta$-silicon nitride the conversion aid being a derivative or source of an element selected from the group consisting of yttrium, scandium, actinium, lanthanum, lithium, sodium, potassium, rubidium, cesium and francium; and
(d) at least one whisker growth enhancing compound in an amount sufficient to promote formation of $\beta$-silicon nitride whiskers, the compound being a derivative or source of an element selected from the group consisting of calcium, sodium, potassium, scandium, titanium, vanadium, chromium, manganese, iron, cobalt, nickel, copper, zinc, strontium, zirconium, niobium, barium, lanthanum, and mixtures thereof, or an oxide of an element selected from the group consisting of gallium, indium, hafnium, tantalum and boron, provided, however, that the element used as a whisker growth enhancing compound differs from that used as a conversion aid, to conditions of temperature and pressure sufficient to provide for densification and in situ formation of $\beta$-silicon nitride whiskers having a high average aspect ratio. In this manner a self-reinforced silicon nitride ceramic body having a fracture toughness greater than about 6 MPa $(m)^{\frac{1}{2}}$, as measured by the Chevron notch technique described hereinbelow, is formed. The process may include a preliminary step of preparing the powder mixture.

For the purposes of the present invention, a "high" average aspect ratio means an average aspect ratio of at least about 2.5. The powder mixture optionally includes aluminum nitride or boron nitride in an amount of from about 0.01 to about five weight percent, based upon total powder mixture weight. Any means may be used to apply pressure and temperature so long as sufficient densification and in situ whisker formation occur. Application of pressure and temperature beneficially occurs by hot-pressing or by hot isostatic pressing, preferably by hot-pressing.

In a second aspect, this invention is a silicon nitride ceramic body having a fracture toughness greater than about 6 MPa $(m)^{\frac{1}{2}}$, as measured by the Chevron notch technique comprising:

(a) a crystalline phase of $\beta$-silicon nitride of which at least about 20 volume percent, as measured by viewing one plane of the silicon nitride ceramic body by scanning electron microscopy, is in the form of whiskers having an average aspect ratio of at least about 2.5; and (b) a glassy phase, in an amount not greater than about 35 weight percent of total body weight, comprising (1) silicon dioxide, (2) a conversion aid, which is a derivative or source of an element selected from the group consisting of yttrium, scandium, actinium, lanthanum, lithium, sodium, potassium, rubidium, cesium and francium, and (3) a $\beta$-silicon nitride whisker growth enhancing compound, said compound being a derivative of an element selected from the group consisting of calcium, sodium, potassium, scandium, titanium, vanadium, chromium, manganese, iron, cobalt, nickel, copper, zinc, strontium, zirconium, niobium, barium, and lanthanum, or an oxide of an element selected from the group consisting of gallium, indium, hafnium, tantalum and boron, the element selected as a whisker growth enhancing compound differing from that selected as a conversion aid. The glassy phase optionally contains an amount, e.g., from about 0.01 to about 15.0 percent by weight of the glassy phase, of aluminum nitride or boron nitride.

In a third aspect, this invention is a cutting tool comprising the above-identified silicon nitride ceramic body.

The silicon nitride ceramic body of this invention exhibits a significantly higher fracture toughness than the monolithic silicon nitride ceramics of the prior art. If the fracture toughness of the silicon nitride ceramic of this invention is normalized with respect to density, the normalized fracture toughness and fracture strength are among the highest known for any ceramic material.

DETAILED DESCRIPTION OF THE INVENTION

The silicon nitride starting material used in preparing the ceramic body of this invention can be any silicon nitride powder. Illustrative powders include the crystalline forms of $\alpha$-silicon nitride and $\beta$-silicon nitride, or the noncrystalline amorphous forms of $\alpha$-silicon nitride and $\beta$-silicon nitride, or mixtures thereof. The silicon nitride powder desirably contains a predominant amount of the $\alpha$-crystalline form, or the amorphous form or mixtures thereof. The starting silicon nitride preferably contains a predominant amount of the alpha crystalline form. The starting powder advantageously possesses a high $\alpha/\beta$ weight ratio, e.g., that attained with a $\beta$-silicon nitride content of 20 weight percent or less. The $\beta$-silicon nitride content is beneficially less than about 10 weight percent, desirably less than about 6 weight percent. The silicon nitride starting material beneficially constitutes from about 80 to about 97 percent by weight of the total powder mixture weight.

An increase in purity of the starting silicon nitride powder generally results in improved properties of the resultant ceramic body. Commercially available silicon nitride powders may, however, contain nonmetallic impurities. Although some impurities may be tolerated, they should be minimized as much as possible. The level of oxygen, present in the form of a silica coating on the surface of silicon nitride particles, may, for example, be reduced by leaching the powder to remove at least a portion of the coating. Elemental silicon, another impurity, is usually present in amounts ranging up to about 0.5 weight percent. These amounts are not deleterious and can be tolerated. Nonmetals, such as carbon which is likely to form silicon carbide during hot-pressing or sintering, are tolerable in small amounts.

The silicon nitride starting powder can be of any size or surface area which yields the ceramic body of this invention via hot-pressing. Certain sizes, however, pose some difficulties. For example, large particles (those having an average diameter in the range 15 to 50 $\mu$m) may be present as hard agglomerates which cannot be easily broken. Powders containing such agglomerates make poor ceramics. On the other hand, very fine powders (those having an average diameter less than about 0.2 $\mu$m) pose processing problems. The starting powder beneficially has an average diameter in the range from 0.2 $\mu$m to about 10.0 $\mu$m. The average diameter is desirably from about 0.2 $\mu$m to about 3.0 $\mu$m. The surface area of the silicon nitride particles is suitably in the range of from about 5 $m^2/g$ to about 15 $m^2/g$, as determined by the Brunauer-Emmett-Teller (BET) method of measuring surface area, which is described by C. N. Satterfield in *Heterogeneous Catalysis in Practice*, McGraw-Hill Book Company, 1980, pp. 102-105. The surface area is beneficially in the range of from about 8 $m^2/g$ to about 15 $m^2/g$.

Raw silicon nitride powders cannot be densified to high densities in the absence of a densification aid. The densification aids form a liquid phase into which the $\alpha$-silicon nitride dissolves. The liquid phase forms at a temperature, or over a temperature range, which varies with the densification aid. The rate of mass transport of $\alpha$-silicon nitride is usually quite rapid in the liquid phase. Thus, the silicon nitride density increases until a critical mass is reached and precipitation occurs.

Silicon dioxide or silica ($SiO_2$) is used as the densification aid for all aspects of the present invention. It is beneficially present in an amount sufficient to promote densification as described herein and yield a silicon nitride ceramic body having a fracture toughness greater than about 6 MPa $(m)^{\frac{1}{2}}$. The amount is desirably from about 1 to about 28 weight percent, preferably from about 3 to about 10 weight percent, based on total weight of the powder mixture.

In addition to a densification aid, the powder mixture must contain a conversion aid. The conversion aid forms a glassy phase through which mass transport is, in general, considerably slower than in the densification aid. Thus, although $\alpha$-silicon nitride dissolves in the conversion aid on heating, it is not readily densified. The conversion aid does, however, promote the rapid, essentially complete conversion of $\alpha$-silicon nitride to $\beta$-silicon nitride. This conversion is desirable because the $\beta$-silicon nitride, in the form of elongated, single crystal grains or whiskers, is believed to be responsible for the high fracture toughness and high fracture strength of the silicon nitride ceramic bodies of this invention. All references to silicon nitride whiskers, single crystal elongated grains or whiskers and single crystal silicon nitride whiskers are intended to be synonymous and may be used interchangeably.

Any amount of conversion aid can be included in the starting powder so long as it is sufficient to cause essentially complete conversion of the starting silicon nitride to $\beta$-silicon nitride and produce the tough silicon nitride ceramic body of the invention. The amount of conversion aid is, based on total weight of the powder mixture, in a range which is beneficially from about 0.2 weight percent to about 29.5 weight percent. The range is desirably from about 1.0 weight percent to about 10.0 weight percent and preferably from about 1.7 weight percent to about 8.5 weight percent.

The conversion aid is suitably a source or derivative of an element selected from the group consisting of yttrium, scandium, actinium, lanthanum, lithium, sodium, potassium, rubidium, cesium and francium. The conversion aid is beneficially yttrium oxide, scandium oxide, lanthanum oxide, actinium oxide or sodium oxide. Yttrium oxide is a preferred conversion aid.

The amount of conversion aid should also be sufficient to provide a weight ratio of conversion aid to silicon dioxide which results in a fracture toughness which is greater than 5 MPa $(m)^{\frac{1}{2}}$, the toughness for nonreinforced, monolithic silicon nitride. The weight ratio is suitably from about 0.25 to about 8, beneficially from about 0.25 to about 5, desirably from about 0.25 to about 3 and preferably from about 0.25 to about 1.8.

The third component required to be present in the powder mixture is a whisker growth enhancing compound. This compound helps to provide a ceramic body of superior fracture toughness and high strength, albeit via a mechanism which is not completely understood. Any amount of the compound in the starting powder is acceptable providing it is sufficient to promote the formation of $\beta$-silicon nitride whiskers, described hereinbelow, and produce the tough silicon nitride ceramic body of this invention. The amount is suitably in a range of from about 0.01 weight percent to about five weight percent based on the total weight of the powder mixture. The range is beneficially from about 0.1 weight percent to about 1.0 weight percent and desirably from about 0.2 weight percent to about 0.5 weight percent.

The whisker growth enhancing compound is suitably a derivative of an element selected from the group consisting of calcium, sodium, potassium, scandium, titanium, vanadium, chromium, manganese, iron, cobalt, nickel, copper, zinc, strontium, zirconium, niobium, barium, lanthanum, and mixtures thereof, or an oxide of an element selected from the group consisting of gallium, indium, hafnium, tantalum and boron. The whisker growth enhancing compound is beneficially an oxide of an element selected from the group consisting of calcium, tantalum, hafnium, niobium and mixtures thereof.

Certain elements, e.g., scandium, lanthanum, sodium and potassium, may be used either as a conversion aid or as a whisker growth enhancing compound. These elements may not, however, simultaneously serve in both capacities. In other words, if an element is used as a conversion aid, it may not be used as a whisker growth enhancing compound in the same powder mixture.

Whisker growth enhancing compounds are desirably in the form of powders which are pure and sufficiently small in size. Purity is not typically a problem. Commercially available materials used as whisker growth enhancing compounds, particularly the oxide powders, generally contain less than 20 ppm each of assorted impurities. These levels of impurities are tolerable. Larger amounts of impurities, e.g., 0.5 weight percent or more, are not recommended as they may cause a change in the final ceramic composition and properties. A small powder particle size is favored because it disperses readily. The oxide powders have an average particle size which is preferably less than about 5 $\mu$m in diameter.

The powder mixture used to prepare the silicon nitride bodies of the present invention include silicon nitride, silicon dioxide, a conversion aid and at least one whisker growth enhancing compound. All components of the powder mixture and suitable amounts of each component are disclosed herein. The amounts of all components other than silicon nitride, when added together, typically result in a sum equal to no more than about 35 weight percent of total powder mixture weight. The sum will, however, depend on probable end use applications for ceramic bodies prepared from the powder mixture. For some applications, a sum in excess of 35 weight percent will provide acceptable results. For applications such as ceramic cutting tools requiring resistance to medium temperatures, e.g., those in a range of from about 900° C. to about 1200° C., or high fracture toughness, e.g., greater than about 7 MPa (m)$^{\frac{1}{2}}$, or both, a sum within a range of from about 4 to about 35 weight percent provides satisfactory results. The sum is desirably within a range of from about 4 to about 10 weight percent. A sum within a range of from about 0.25 to about 4 weight percent provides acceptable results for applications such as ceramic engine parts which typically require resistance to high temperatures, e.g., those in a range of from about 1200° C. to about 1400° C., or moderate fracture toughness, e.g., from about 6 to about 7 MPa (m)$^{\frac{1}{2}}$ or both.

The powder mixture may be prepared in any suitable manner. Ball-milling of the components in powder form is one acceptable manner of preparation.

An attritor with zirconia balls is desirably used to prepare a finely-divided suspension of powder mixture components in a carrier medium. Excess carrier medium is beneficially removed via filtration or otherwise to leave an admixture of residue from the suspension and the attritor balls. The admixture is dried prior to separating the attritor balls from the residue or powder mixture.

The powder mixture components need not be added in any particular order. For example, powdered components other than the silicon nitride may be added either singly or in combination to a colloidal suspension of silicon nitride in a carrier medium or vice versa. As an alternative, all components of the powder mixture may be added simultaneously to the carrier medium prior to attritor milling. The latter method is preferred, particularly when an organic carrier medium such as toluene or an alcohol is employed.

The carrier medium may be any inorganic or organic compound which is a liquid at room temperature and atmospheric pressure. Examples of suitable carrier media include water; alcohols, such as methanol, ethanol and isopropanol; ketones, such as acetone and methyl ethyl ketone; aliphatic hydrocarbons, such as pentanes and hexanes; and aromatic hydrocarbons, such as benzene and toluene. The carrier medium is desirably an organic liquid, preferably toluene or an alcohol such as methanol.

The function of the carrier medium is to impart a viscosity suitable for mixing to the solid powders. Any quantity of carrier medium which achieves this viscosity is sufficient and acceptable. The quantity suitably yields a solids content in a range of from about 20 to about 50 volume percent, based upon total volume of solids and carrier medium. The solids content range is beneficially from about 35 to about 45 volume percent. A solids content of less than 20 volume percent provides in a viscosity which is too low for effective mixing of powder mixture components. Similarly, a solids content in excess of 50 volume percent translates to a viscosity which is so high that mixing is difficult, if not impractical.

One or more surfactants or dispersants can be added to the suspension to aid in dispersing components of the powder mixture. The choice of surfactant(s) or dispersant(s) can vary widely as is well-known in the art.

If the carrier medium is toluene, a coupling agent, such as an aluminate coupling agent commercially available from Kenrich Petrochemicals under the trade designation KEN-REACT KA 322, may be used to aid in forming a suspension. When using an alcohol such as methanol, a dispersant, such as a polyethylene imine, may be used to facilitate mixing and a flocculant, such as oleic acid, may be used to ease recovery of the powder mixture.

Any amount of surfactant or dispersant is acceptable as long as it improves dispersion of powder mixture components. A typical amount of surfactant is in a range from about 0.01 to 1.0 weight percent, based upon powder mixture weight.

The finely-divided suspension is now ready for processing into greenware. The suspension can be slip-cast by techniques well-known in the art for eventual sintering. Alternatively, the suspension can be dried into a powder and ground for use in hot-pressing processes. Drying is accomplished by standard drying means, such as by spray-drying or oven drying under a nitrogen purge. Drying of the admixture of the powder mixture and the attritor balls is desirably accomplished in an oven under a nitrogen purge after removal of excess carrier medium. During the drying process, additional free carrier medium is removed. Temperatures used in of the drying depend on the boiling point of the carrier medium employed. Typically, the drying process is conducted at a temperature just below the boiling point of the carrier medium under atmospheric pressure. The carrier medium is beneficially toluene or an alcohol and the temperature of drying is about 50° C. After drying, the resulting powder is separated from the attritor balls and sieved through a screen to obtain a powder having a maximum agglomerate diameter of about 100 $\mu$m. The screen size is usually less than about 60 mesh (250 $\mu$m); preferably, less than about 80 mesh (180 $\mu$m). The powder obtained on sieving is the powder mixture used in processing via hot-pressing.

Hot-pressing, or heating a powder under pressure, is a preferred method of converting the powder mixture into the silicon nitride ceramic bodies of the present invention. Any standard hot-pressing equipment, such as a graphite die equipped with a heating means and a hydraulic press, is acceptable. Hot-pressing is usually conducted under an inert atmosphere, such as nitrogen, to prevent the oxidation and decomposition of silicon nitride at high temperatures. The direction of pressing is uniaxial and perpendicular to the plane of press plates.

Any combination of processing temperature and pressure will suffice if it produces the novel silicon nitride ceramic of this invention. Typically, however, the temperature must be carefully controlled because the elongated β-silicon nitride whiskers are found to form in a narrow temperature range. The pressing temperature is beneficially maintained within a range of from about 1750° C. to about 1870° C. The temperature range is desirably from about 1800° C. to about 1850° C., preferably from about 1820° C. to about 1840° C. Temperatures of less than about 1750° C. may retard formation of elongated β-silicon nitride whiskers. At temperatures in excess of 1870° C., silicon nitride may decompose or special pressure equipment may be required to conduct the densification. Skilled artisans recognize, however, that the use of high pressure techniques such as hot isostatic pressing may allow use of higher temperatures, e.g. up to 2000° C. or even 2100° C. The accurate measurement of temperatures as high as 2100° C. is technically difficult and some variation may be observed depending on the measurement technique. Temperatures are beneficially measured by use of a tungsten-rhenium thermocouple such as that obtained from and calibrated by the Omega Company.

While the pressure during hot-pressing is important, it is not quite as critical a parameter as temperature. Typically, the pressure should be sufficient to cause densification of the green body. The pressure is beneficially in a range of from about 3000 psig to about 6000 psig (20.7 to 41.4 MPa). The range is desirably from about 4000 psig to about 5500 psig (27.6 to 37.9 MPa) and preferably from about 4500 psig to about 5200 psig (31.0 to 35.9 MPa). A pressure of less than about 20.7 MPa will not lead to sufficient densification. Although a pressure in excess of 41.4 MPa will yield substantially complete densification in a shorter time and at a reduced pressure, such a pressure may inhibit the formation of elongated β-silicon nitride crystals.

Time at pressure should be sufficient to bring the powder to essentially complete densification. Ram movement is an acceptable indicator of the extent of densification. As long as the ram continues to move, densification is incomplete. When the ram stops moving for 15 minutes or more, densification is essentially complete, e.g., about 99 percent or more of the theoretical value. A halt in ram movement of less than 15 minutes may be an acceptable indicator for a skilled press operator. Thus, the time required for hot-pressing is the time during ram movement plus a safety margin of 10 minutes or more, desirably 15 to 30 minutes. The time is suitably in a range of from about 15 minutes to about 2 hours. The range is beneficially from about 30 minutes to about 90 minutes, desirably from about 45 minutes to about 75 minutes.

Densification via hot-pressing facilitates formation of silicon nitride ceramic articles which can be used as cutting tools. Hot-pressing lends itself to fabrication of a variety of shapes, one of which is a flat plate. Such a plate may range in size from about 2 inches (5.1 cm) in length by about 1.5 (3.8 cm) inches in width by about 0.45 inch (1.1 cm) in thickness to about 16 inches (40.6 cm) in length by about 16 inches (40.6 cm) in width by about 1.0 inch (2.5 cm) in thickness. Smaller and larger plates can also be fabricated, as determined by the size of the hot-pressing plaques. Cutting tools can be fabricated by slicing and grinding these plates into a variety of cutting tool shapes.

The silicon nitride ceramic body prepared in accordance with this invention is a dense material having no significant porosity. The body has a density which is suitably greater than 95 percent of the theoretical value, beneficially greater than 97 percent of the theoretical value, and desirably greater than 99 percent of the theoretical value.

X-ray diffraction analysis of the silicon nitride body shows that silicon nitride is present in its beta crystalline form, indicating essentially complete alpha to beta conversion during processing. Quite unexpectedly, the β-silicon nitride is predominately present as single crystal, "needle-like" whiskers, as determined by both scanning electron microscopy (SEM) and transmission electron microscopy (TEM). The size of the hexagonal β-silicon nitride grains or whiskers is usually in a range of from about 1 μm to about 20 μm in length with a mean diameter of from about 0.2 μm to about 0.5 μm; desirably in a range of from about 5 μm to about 10 μm in length with a mean diameter from about 0.3 μm to about 0.5 μm.

Since the whiskers are oriented randomly, it is difficult to determine exactly the percentage of silicon nitride which exists as whiskers, as opposed to equiaxed particles. The measurement is made by viewing one plane of the silicon nitride ceramic in a scanning electron microscope (SEM) and measuring the percentage by volume occupied by whiskers having an aspect ratio between 2 and 16. Observations of the silicon nitride bodies of the present invention show that the whiskers are homogeneously distributed and randomly oriented throughout the body. The observations also show that the volume occupied by the whiskers is approximately the same in all planes. Using this measurement criterion, the whiskers desirably occupy at least about 20 volume percent, preferably at least about 35 volume percent, of the total body volume.

The whiskers found in the silicon nitride bodies have an unexpectedly high average aspect ratio (ratio of length to diameter). The average aspect ratio is typically at least about 2.5, desirably at least about 5.5. Because the aspect ratio is measured in a plane, the average aspect ratio is actually a lower bound. For example, a whisker which is perpendicular to the plane may have an apparent aspect ratio of less than 2; whereas the true aspect ratio may be very much greater than 2.

In addition to the β-silicon nitride phase, the ceramic body of this invention contains a glassy second phase, which constitutes no greater than about 35 weight percent of total body weight. The glassy second phase has a bulk chemical composition, as determined by neutron activation analysis consisting essentially of from about 8 weight percent to about 80 weight percent of silicon dioxide, from about 20 weight percent to about 90 weight percent conversion aid and from about 0.1 weight percent to about 25 weight percent whisker growth enhancing compound.

The mechanical properties of the self-reinforced silicon nitride ceramic body are readily measured by use of standard tests. In particular, fracture toughness ($K_{IC}$) is measured according to the Chevron notch and Palmqvist methods. Fracture strength (modulus of rupture) is measured according to the Military Standard 1942b test.

Hardness is measured according to the Vickers indentation test. These tests and test sample preparation techniques are described in U.S. Pat. No. 4,919,689 at column 10, line 58 through column 12, line 20, the teachings of which are incorporated herein by reference.

The fracture strength at room temperature is suitably at least about 650 MPa, desirably from about 750 MPa to about 1250 MPa. At 1000° C., the fracture strength is suitably at least about 550 MPa.

The fracture toughness of the silicon nitride ceramic body of this invention, as measured at room temperature (taken as 23° C.) by the Chevron notch technique, is suitably greater than about 6 MPa $(m)^{\frac{1}{2}}$, beneficially greater than about 7 MPa $(m)^{\frac{1}{2}}$, and preferably greater than about 8 MPa $(m)^{\frac{1}{2}}$.

The Vickers hardness number (at room temperature) of the silicon nitride ceramic of this invention is beneficially at least about 1325 kg/mm$^2$, desirably from about 1340 kg/mm$^2$ to about 1600 kg/mm$^2$ and preferably from about 1450 kg/mm$^2$ to about 1650 kg/mm$^2$.

The silicon nitride ceramic body of this invention exhibits a Palmqvist toughness at room temperature which is beneficially at least about 37 kg/mm, desirably from about 37 kg/mm to about 52 kg/mm.

ILLUSTRATIVE EMBODIMENTS

The following examples serve to illustrate the novel self-reinforced silicon nitride composition of this invention, the method of preparing the novel silicon nitride ceramic, and the utility of the composition as a cutting tool. The examples are not intended to be limiting of the scope of this invention. All percentages are weight percent unless otherwise noted.

EXAMPLES 1-6

A series of six compositions containing 88.0 percent silicon nitride, varying amounts of yttria and silica and 0.3 percent of calcium oxide (CaO), tantalum oxide (Ta$_2$O$_5$), hafnium oxide (HfO$_2$) or niobium oxide (Nb$_2$O$_5$) are converted to densified materials by procedures described hereinafter and subjected to Vickers Hardness (kg/mm$^2$), Palmqvist Toughness (kg/mm) and flexure strength (MPa) testing. The contents of each composition are shown in the Table together with the ratio of conversion aid (yttria) to silicon dioxide and test results.

The silicon nitride (UBE-SN-E-10) contains 1.20 percent oxygen, 0.08 percent carbon, and the following major metallic impurities: 49 parts per million (ppm) iron, 21 ppm Al, and 10 ppm Cr, Ni and Ca. The silicon nitride is present in the alpha and beta crystalline forms in an $\alpha/\beta$ weight ratio of 95/5. The BET surface area of the silicon nitride powder is 10 m$^2$/g and the average particle size is about 0.2 $\mu$m in diameter.

The silica (Cab-O-Sil, Lot IF 054, Grade L-90 (Cabot Corporation)) has a BET surface area of 100 m$^2$/g and an average particle diameter of 0.027 $\mu$m. The silica contains the following major metallic impurities: <2 ppm Al, <5 ppm Zr, and <2 ppm of V, Ti and Ca combined.

The yttrium oxide (Molycorp) contains less than 10 ppm each of sodium and iron. The Y2O3 particles range in size from 2 $\mu$m to 5 $\mu$m in diameter.

The calcium oxide (Aldrich Chemical Co.) contains less than 0.002 percent each of lead and iron. The average CaO particle size is about 3 $\mu$m in diameter.

The tantalum oxide (Matheson, Coleman and Bell) has a 99.5% purity. The principal impurities are less than 100 ppm niobium and less than 10 ppm each of aluminum, magnesium, iron, copper and tin.

Hafnium dioxide (Morton Thiokol, Inc. (Alfa Products)) is 99.9% pure. Its main impurity is about 100 ppm zirconium.

Niobium oxide (Morton Thiokol, Inc.) is 99.9% pure. Its main impurity is 50 ppm of tantalum.

Each of the above-identified compositions is suspended in 160 ml of methanol and agitated at room temperature under air by means of a mechanical attritor for 1 hour to form a slurry of mixed powders. Attrition takes place in a 750 cc tank containing 1220 grams of 3/16 inch (0.48 cm) zirconia balls. The slurry has a solids content of 25 volume percent, based upon total slurry volume. The attritor operates at a speed of 200–250 revolutions per minute (rpm) (21–26 radians per second) for the first six minutes and 300 rpm (31 radians per second) for the last 54 minutes. Following attrition, the slurry is poured through a 100 mesh (150 $\mu$m) nylon sieve. Oleic acid (fourteen drops) is added to flocculate the compositions or mixed powders out of suspension. The flocculated powders are dried in an oven at 70° C. for a period of 12 hours under a flow of dry nitrogen gas. After drying, the mixed powders are passed through a 60 mesh (250 $\mu$m) sieve. The resulting powder mixture contains 88.0 percent silicon nitride, 9.27 percent silica, 2.43 percent yttrium oxide, and 0.3 percent whisker growth aid (tantalum oxide, calcium oxide, hafnium oxide or niobium oxide).

A 170 g quantity of the resulting powder mixture is poured into a graphite die in the shape of a plate measuring 3 inches (7.6 cm) in length by 2.5 inches (6.4 cm) in width by 0.4 inches (1 cm) in depth. A pressure of 1000 psig (6.9 MPa) is applied to the die, while the temperature is raised from ambient to about 1200° C. in about 30 minutes. At about 1200° C., the pressure is gradually increased to 5000 psig (34.5 MPa) and maintained thereat. The temperature is then increased to 1825° C. over a 40 minutes period. The die is maintained at 1825° C. and a pressure of 5000 psig (34.5 MPa) for 60 minutes. Afterwards the die is cooled over a 2 hour period to 100° C. At 1500° C., the pressure is slowly released. When the die reaches room temperature, it is opened, and a silicon nitride ceramic body in the shape of a plate having the above-identified dimensions is retrieved.

The density of the silicon nitride ceramic body, prepared hereinabove, is measured by the water immersion method, as described in "Modern Ceramic Engineering" by D. W. Richerson, Marcel Dekker, 1982, and by stereology analysis from SEM photomicrographs. The density is essentially 100 percent of theoretical. The material is therefore essentially nonporous.

Silicon nitride is present essentially in the $\beta$ crystalline phase, as determined by X-ray diffraction. The microstructure of the silicon nitride ceramic, prepared hereinabove, is determined by scanning electron microscopy (SEM), as viewed in a plane. About 35 volume percent of the silicon nitride appears in the form of elongated whiskers having an aspect ratio ranging from 2 to 16. The average aspect ratio is about 3.0.

TABLE*

| Ex. No. | Total % SiO$_2$** | % Y$_2$O$_3$ | Whisker Growth Aid*** | Y$_2$O$_3$/SiO$_2$ | Palmqvist Toughness (kg/mm) | Vickers Hardness (kg/mm$^2$) | Flexure Strength (MPa) |
|---|---|---|---|---|---|---|---|
| 1 | 4.43 | 7.27 | CaO | 1.64 | 39.5 | 1482 | 772 |
| 2 | 6.85 | 4.85 | CaO | 0.7 | 40.3 | 1490 | — |
| 3 | 8.27 | 2.43 | CaO | 0.26 | 40.6 | 1480 | 895 |
| 4 | 9.27 | 2.43 | Ta$_2$O$_5$ | 0.26 | 41.5 | 1485 | 882 |
| 5 | 9.27 | 2.43 | HfO$_2$ | 0.26 | 38.1 | 1485 | 756 |
| 6 | 4.43 | 7.27 | Nb$_2$O$_5$ | 1.64 | 41.2 | 1490 | — |

*Percentages of components are based on weight percent in the powder mixture. Toughness and hardness values are measured at room temperature.
— means not measured
**Si$_3$N$_4$ contains 1.2 wt % of oxygen. Total SiO$_2$ is a sum of SiO$_2$ introduced by Si$_3$N$_4$ and addition of SiO$_2$
***0.3 percent by weight The fracture strength (Military Standard 1942b) of Example 4 is 128 ksi (882 MPa) at room temperature. The fracture toughness measured by the Chevron notch technique is 7.2 MPa (m)$^{\frac{1}{2}}$ at room temperature. Similar results are expected for Examples 1–3, 5 and 6.

The data show that the silicon nitride materials all have satisfactory properties in conjunction with fracture toughness values greater than 6 MPa(m)$^{\frac{1}{2}}$. Similar results are expected with other compositions disclosed herein.

What is claimed is:

1. A process for preparing a silicon nitride ceramic body having a fracture toughness greater than about 6 MPa (m)$^{\frac{1}{2}}$ and containing predominantly β-silicon nitride whiskers having a high average aspect ratio, the process comprising:

subjecting a powder mixture comprising
   (a) silicon nitride in an amount sufficient to provide a ceramic body;
   (b) silicon dioxide in an amount sufficient to promote densification of the powder;
   (c) a conversion aid in an amount sufficient to attain essentially complete conversion of the starting silicon nitride to β-silicon nitride, the conversion aid being a source of an element selected from the group consisting of yttrium, scandium, actinium, lanthanum, lithium, sodium, potassium, rubidium, cesium and francium; and
   (d) at least one whisker growth enhancing compound in an amount sufficient to promote formation of β-silicon nitride whiskers, said compound being a derivative of an element selected from the group consisting of calcium, sodium, potassium, scandium, titanium, vanadium, chromium, manganese, iron, cobalt, nickel, copper, zinc, strontium, zirconium, niobium, barium, lanthanum, and mixtures thereof, or an oxide of an element selected from the group consisting of gallium, indium, hafnium, tantalum and boron, provided, however, that the element used as a whisker growth enhancing compound differs from that used as a conversion aid,
   to conditions of temperature and pressure sufficient to provide for densification of the powder mixture, in situ formation of β-silicon nitride whiskers having an average aspect ratio of at least about 2.5 occur and preparation of a silicon nitride ceramic body having a fracture toughness greater than about 6 MPa (m)$^{\frac{1}{2}}$, the conditions of temperature and pressure including a temperature of at least 1750 degrees Centigrade and a pressure of at least 20.7 megapascals.

2. The process of claim 1 wherein the β-silicon nitride whiskers are present in an amount of at least about 20 volume percent, as measured by viewing one plane of the silicon nitride ceramic body by scanning electron microscopy.

3. The process of claim 1 wherein the amount of silicon dioxide is from about 1 to about 28 weight percent based on the total weight of the powder mixture.

4. The process of claim 1 wherein the conversion aid is present in an amount within a range of from about 0.2 weight percent to about 29.5 weight percent based on the total weight of the powder mixture.

5. The process of claim 4 wherein the conversion aid is selected from the group consisting of oxides of yttrium, scandium, lanthanum, actinium and sodium.

6. The process of claim 1 wherein the silicon dioxide and the conversion aid are present in a ratio of conversion aid to silicon dioxide of from about 0.25 to about 8.

7. The process of claim 1 wherein the whisker growth enhancing compound is present in an amount of from about 0.01 to about five weight percent based upon total weight of the powder mixture.

8. The process of claim 1 wherein the whisker growth enhancing compound is an oxide of an element selected from the group consisting of calcium, tantalum, hafnium, niobium and mixtures thereof.

9. The process of claim 1 wherein the amount of silicon nitride is from about 80 to about 97 weight percent based upon total weight of the powder mixture.

10. The process of claim 1 wherein the powder mixture further comprises aluminum nitride or boron nitride in an amount of from about 0.01 to about 5 weight percent based upon total weight of the powder mixture.

11. The process of claim 1 wherein the temperature is in the range from about 1750° C. to about 1870° C.

12. The process of claim 1 wherein the pressure is in the range from about 3000 psig (20.7 MPa) to about 6000 psig (41.4 MPa).

13. A silicon nitride ceramic body having a fracture toughness greater than about 6 MPa (m)$^{\frac{1}{2}}$, as measured by the Chevron notch technique at about 23° C., comprising:

(a) a crystalline phase of β-silicon nitride of which at least about 20 volume percent, as measured by viewing one plane of the silicon nitride ceramic body by scanning electron photomicrographs, is in the form of whiskers having an average aspect ratio of at least about 2.5; and
   (b) a glassy phase, in an amount not greater than about 35 weight percent of total body weight, comprising (1) silicon dioxide, (2) a conversion aid which is a source of an element selected from the group consisting of yttrium, scandium, actinium, lanthanum, lithium, sodium, potassium, rubidium, cesium and francium, and (3) a β-silicon nitride whisker growth enhancing compound, said compound being a derivative of an element selected from the group consisting of calcium, sodium, potassium, scandium, titanium, vanadium, chromium, manganese, iron, cobalt, nickel, copper, zinc, strontium, zirconium, niobium, barium, and lanthanum, or an oxide of an element selected from the group consisting of gallium, indium, hafnium, tantalum and boron, the element selected as a whisker growth enhancing compound differing from that selected as a conversion aid.

14. The body of claim 13 wherein the whisker growth enhancing compound is an oxide of an element selected from the group consisting of calcium, niobium, hafnium, tantalum and mixtures thereof.

15. The body of claim 13 wherein the glassy phase comprises from about 8 percent to about 80 percent silicon dioxide, from about 20 percent to about 90 percent conversion aid, and from about 0.1 percent to about 25 percent $\beta$-silicon nitride whisker growth enhancing compound; the weight ratio of conversion aid to silicon dioxide is in a range from about 0.25 to about 8; and not greater than about 10 weight percent of total body weight is present as other phases.

16. The body of claim 13 wherein the glassy phase further comprises aluminum nitride or boron nitride in an amount of from about 0.01 to about 15.0 weight percent based upon total glassy phase weight.

17. A cutting tool fabricated from the body of claim 15.

* * * * *